US012689453B2

(12) United States Patent
Joon et al.

(10) Patent No.: US 12,689,453 B2
(45) Date of Patent: Jul. 21, 2026

(54) ANTENNA COMBINING FOR PHYSICAL RANDOM ACCESS CHANNEL (PRACH)

(71) Applicant: Radisys Corporation, Hillsboro, OR (US)

(72) Inventors: Rahul Joon, Jhajjar (IN); Gaurab Basu, Bengaluru (IN); Saptarshi Chaudhuri, Bangalore (IN)

(73) Assignee: Radisys Corporation, Hillsboro, OR (US)

( * ) Notice: Subject to any disclaimer, the term of this patent is extended or adjusted under 35 U.S.C. 154(b) by 322 days.

(21) Appl. No.: 18/517,245

(22) Filed: Nov. 22, 2023

(65) Prior Publication Data

US 2025/0167898 A1     May 22, 2025

(51) Int. Cl.
*H04B 17/17* (2015.01)
*H04L 27/26* (2006.01)
*H04W 74/0833* (2024.01)

(52) U.S. Cl.
CPC ......... *H04B 17/17* (2015.01); *H04L 27/2614* (2013.01); *H04W 74/0833* (2013.01)

(58) Field of Classification Search
CPC . H04B 17/17; H04L 27/2614; H04W 74/0833
See application file for complete search history.

(56) References Cited

U.S. PATENT DOCUMENTS

| | | | |
|---|---|---|---|
| 11,129,209 B2 | 9/2021 | Carlsson et al. | |
| 2008/0311863 A1* | 12/2008 | Nishio | H04B 17/327 455/101 |
| 2017/0187560 A1* | 6/2017 | Ng | H03F 1/3282 |
| 2021/0058822 A1 | 2/2021 | Ly et al. | |
| 2021/0315022 A1 | 10/2021 | Xu et al. | |
| 2021/0328847 A1* | 10/2021 | Zach | H04B 7/0617 |
| 2024/0422039 A1* | 12/2024 | Patchava | H04L 27/2614 |

* cited by examiner

*Primary Examiner* — Steven Hieu D Nguyen
(74) *Attorney, Agent, or Firm* — Stoel Rives LLP

(57) ABSTRACT

The disclosed system and method address the challenge of antenna streams that are compromised and unable to provide accurate PRACH data due to a spectrum of issues, including but not limited to broken antennas. These issues may range from loose connections and damaged antenna elements to open Radio Unit (O-RU) anomalies in open RAN systems, poor channel conditions, or human error. By tackling these problems, the proposed solution significantly improves the probability of detecting the preamble and enhances the robustness of the system, ensuring more dependable PRACH data acquisition and processing.

18 Claims, 19 Drawing Sheets

1900

DETECT AN RF ANOMALY BASED ON A PEAK TO AVERAGE POWER RATIO FOR EACH RECEIVE ANTENNA 1902

DETERMINE A WEIGHT FACTOR FOR EACH RECEIVE ANTENNA AND A COMPOSITE SCALING VALUE 1904

IN RESPONSE TO DETECTION OF AN RF ANOMALY, GENERATE A PROCESSED PRACH STREAM FROM EACH RECEIVE ANTENNA, IN WHICH EACH PROCESSED PRACH STREAM IS GRADED ACCORDING TO ITS ASSOCIATED WEIGHT FACTOR AND THE COMPOSITE SCALING VALUE 1906

DETERMINE A COMBINED PRACH SIGNAL BASED ON EACH PROCESSED PRACH STREAM SUCH THAT THE RF ANOMALY IS SUPPRESSED BY THE ASSOCIATED WEIGHT FACTOR THAT IS LOWER THAN THAT OF A NON-ANOMALOUS PRACH SIGNAL 1908

| Ant0 | | Ant1 | | Ant2 | | Ant3(faulty) | | Ant0 | Ant1 | Ant2 | Ant3(faulty) |
| --- | --- | --- | --- | --- | --- | --- | --- | --- | --- | --- | --- |
| I | Q | I | Q | I | Q | I | Q | abs i.e. absolute vale | | | |
| 150 | -7 | 133 | 7 | 159 | 8 | -124 | 356 | 22849 | 17738 | 25345 | 142112 |
| 136 | 52 | 117 | 58 | 137 | 73 | -95 | 383 | 21200 | 17053 | 24098 | 155714 |
| 96 | 92 | 78 | 92 | 84 | 113 | -106 | 472 | 17680 | 14548 | 19825 | 234020 |
| 47 | 103 | 31 | 99 | 23 | 115 | -215 | 582 | 12818 | 10762 | 13754 | 384949 |
| 6 | 89 | -7 | 84 | -21 | 86 | -433 | 621 | 7957 | 7105 | 7837 | 573190 |
| -14 | 62 | -25 | 56 | -36 | 43 | -693 | 505 | 4040 | 3761 | 3145 | 735274 |
| -14 | 36 | -24 | 30 | -32 | 10 | -872 | 215 | 1492 | 1476 | 584 | 806609 |
| -2 | 23 | -13 | 17 | 5 | -1 | -852 | -164 | 533 | 458 | 26 | 752800 |
| 10 | 25 | -3 | 17 | 26 | 10 | -608 | -488 | 725 | 298 | 776 | 607808 |
| 13 | 35 | -1 | 24 | 30 | 31 | -212 | -615 | 1394 | 577 | 1861 | 423169 |
| 5 | 45 | -8 | 28 | 17 | 48 | 174 | -409 | 2050 | 848 | 2593 | 269397 |
| -9 | 47 | -19 | 23 | -4 | 50 | 393 | -175 | 2290 | 890 | 2516 | 185074 |
| -23 | 39 | -24 | 11 | -20 | 38 | 376 | 167 | 2050 | 637 | 1844 | 169265 |
| -31 | 25 | -20 | -3 | -24 | 21 | 172 | 380 | 1586 | 409 | 1017 | 173984 |
| -29 | 10 | -8 | -12 | -15 | 18 | -70 | 384 | 941 | 208 | 306 | 152356 |
| -22 | -1 | 7 | -11 | -4 | 9 | -191 | 232 | 485 | 170 | 97 | 90205 |
| -12 | -6 | 17 | -1 | 1 | 18 | -120 | 68 | 180 | 290 | 325 | 19024 |
| -3 | -6 | 18 | 12 | -5 | 28 | 88 | 49 | 45 | 468 | 809 | 10145 |
| 3 | -3 | 12 | 21 | -20 | 29 | 276 | 247 | 18 | 585 | 1241 | 137185 |
| 7 | 1 | 3 | 25 | -32 | 18 | 268 | 601 | 50 | 634 | 1348 | 433025 |
| 9 | 5 | -4 | 23 | -36 | 0 | -15 | 928 | 106 | 545 | 1296 | 857701 |
| 9 | 10 | -8 | 20 | -26 | -16 | -515 | 1032 | 161 | 464 | 932 | 1330249 |
| 7 | 15 | -10 | 17 | -9 | -23 | -1043 | 798 | 274 | 389 | 610 | 1724653 |

FIG. 8

| pOut without IPAC algorithm | pOut with IPAC algorithm |
|---|---|
| 191532.8958 | 700756.9536 |
| 210968.6667 | 689574.1927 |
| 246118.1458 | 641790.8407 |
| 288970.4583 | 572366.5235 |
| 328809.3542 | 500703.3627 |
| 361120.25 | 439572.2518 |
| 376366.7708 | 396430.2778 |
| 371199.8125 | 368469.4338 |
| 351897.875 | 348360.2508 |
| 320821.7083 | 327527.2035 |
| 288955.375 | 304444.6586 |
| 266063.625 | 282508.2909 |
| 257399.4792 | 268074.5931 |
| 263808.6875 | 267278.1237 |
| 278312.125 | 278619.5409 |
| 292228.8958 | 296337.1297 |
| 295922.5 | 310964.176 |
| 288177.6042 | 317015.0712 |
| 273233.375 | 314080.9273 |
| 262908.1875 | 310367.9706 |
| 285852.6875 | 320793.0107 |
| 286215.5833 | 334156.9877 |
| 323933.0417 | 360424.4529 |

FIG. 9 pdo_arresst_combined
total resource of antenna

| | Ant0 | Ant1 | Ant2 | Ant3(faulty) |
|---|---|---|---|---|
| Power | | | | |
| | 17896 | 17370 | 18642 | 713104 |
| | 16142 | 16274 | 17622 | 793597 |
| | 13488 | 13431 | 14718 | 942837 |
| | 9761 | 9773 | 10723 | 1125624 |
| | 6030 | 6130 | 6692 | 1300388 |
| | 2950 | 3172 | 3350 | 1435009 |
| | 1011 | 1260 | 1258 | 1501939 |
| | 240 | 434 | 391 | 1487725 |
| | 295 | 332 | 377 | 1406588 |
| | 692 | 529 | 713 | 1281353 |
| | 1026 | 690 | 995 | 1153110 |
| | 1099 | 668 | 956 | 1061532 |
| | 894 | 495 | 710 | 1027500 |
| | 614 | 337 | 424 | 1054251 |
| | 443 | 390 | 325 | 1112950 |
| | 502 | 530 | 590 | 1167322 |
| | 798 | 902 | 996 | 1180995 |
| | 1227 | 1297 | 1553 | 1148633 |
| | 1622 | 1589 | 2038 | 1087685 |
| | 1874 | 1738 | 2293 | 1045748 |
| | 2262 | 2479 | 1993 | 1055878 |
| | 2067 | 2178 | 1822 | 1138795 |
| | 1740 | 1764 | 1527 | 1290701 |

FIG. 11

| PRACH_peak_threshold | 4.843 |
|---|---|
| faulty_stream_detector_threshold | 0.203125 |
| nRA | 4 |

Final computation

| | Ant0 | Ant1 | Ant2 | Ant3(faulty) |
|---|---|---|---|---|
| Avg | 340.6899 | 351.9626 | 356.8742 | 1076999.15 |
| Max | 17096.17 | 17369.58 | 18642.33 | 203865.5 |
| revised_avg | 222.1412 | 229.1077 | 226.8313 | 1076999.15 |
| papr | | | | 1.892931391 |
| max_papr | 82.18588 | 82.18588 | 82.18588 | 82.18587757 |
| Faulty stream | 0 | 0 | 0 | 1 |
| sum_papr | 236.8537 | 236.8537 | 236.8537 | 236.8536917 |
| Antenna weights | | | | 0.031967944 |
| Old_avg | 269512.2 | | | |
| New_avg | 8954.553 | | | |
| Scaling_factor | 30.09778 | | | |

FIG. 12

| mask | Ant0 | Ant1 | Ant2 | Ant3(faulty) |
|------|------|------|------|--------------|
| | 0 | 0 | 0 | 1 |
| | 0 | 0 | 0 | 1 |
| | 0 | 0 | 0 | 1 |
| | 0 | 0 | 0 | 1 |
| | 0 | 0 | 0 | 1 |
| | 0 | 0 | 0 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 1 | 1 |
| | 1 | 1 | 0 | 1 |
| | 0 | 0 | 0 | 1 |
| | 0 | 0 | 0 | 1 |
| | 0 | 0 | 0 | 1 |
| | 0 | 0 | 1 | 1 |

FIG. 13

| Ant0 | Ant1 | Ant2 | Ant3 |
|---|---|---|---|
| 0 | 0 | 0 | 713103.5 |
| 0 | 0 | 0 | 793596.9 |
| 0 | 0 | 0 | 942836.8 |
| 0 | 0 | 0 | 1125624 |
| 0 | 0 | 0 | 1300386 |
| 0 | 0 | 0 | 1435009 |
| 1010.667 | 1259.583 | 1257.5 | 1501939 |
| 239.5833 | 434.0833 | 390.9167 | 1487735 |
| 294.9167 | 331.6667 | 377.0833 | 1406388 |
| 691.75 | 528.9167 | 713.1667 | 1281353 |
| 1026.167 | 683.6667 | 995.25 | 1153110 |
| 1098.667 | 668 | 956.1667 | 1061532 |
| 893.5833 | 495.0833 | 709.5 | 1027500 |
| 614.25 | 337.0833 | 424.4167 | 1054251 |
| 443.25 | 330.25 | 324.8333 | 1112950 |
| 501.5833 | 530.4167 | 529.75 | 1167322 |
| 797.8333 | 901.5 | 995.6667 | 1180995 |
| 1227.25 | 1297.25 | 1553.25 | 1148633 |
| 1622.167 | 1589.5 | 0 | 1087685 |
| 0 | 0 | 0 | 1045748 |
| 0 | 0 | 0 | 1055878 |
| 0 | 0 | 0 | 1138795 |
| 0 | 0 | 1526.667 | 1290701 |

FIG. 14

| Ant0 | Ant1 | Ant2 | Ant3 (faulty) |
|---|---|---|---|
| 668779.072 | 669350.493 | 778774.428 | 686123.8217 |
| 631466.393 | 627118.486 | 736140.055 | 763571.8368 |
| 527612.88 | 517554.832 | 614830.345 | 907165.3051 |
| 381846.986 | 376616.629 | 447965.527 | 1083036.951 |
| 235865.94 | 236205.081 | 279555.053 | 1251187.377 |
| 115406.557 | 122241.926 | 139923.737 | 1380716.787 |
| 39535.9222 | 48539.0299 | 52531.4523 | 1445114.707 |
| 9372.17813 | 16727.7411 | 16380.354 | 1431447.462 |
| 11536.7438 | 12781.0347 | 15752.4733 | 1353370.752 |
| 27060.3307 | 20382.2178 | 29792.1914 | 1232874.074 |
| 40142.2614 | 28576.845 | 41576.0858 | 1109483.442 |
| 42978.364 | 25741.903 | 39943.3985 | 1021369.498 |
| 34935.7795 | 19078.4239 | 29639.0182 | 988625.1509 |
| 24028.6348 | 12989.7702 | 17729.8003 | 1014364.29 |
| 17399.3445 | 12726.4423 | 13569.7549 | 1070842.622 |
| 19621.2861 | 20440.0215 | 22130.0492 | 1123157.182 |
| 31210.1601 | 34740.0083 | 41593.4918 | 1136313.036 |
| 48008.3712 | 49990.5444 | 64886.265 | 1105175.104 |
| 63456.9807 | 61214.0912 | 85119.055 | 1046533.582 |
| 73298.5827 | 66201.2837 | 93788.9623 | 1006183.074 |
| 88492.9208 | 95534.1493 | 83235.7206 | 1015929.252 |
| 80874.5625 | 83834.1465 | 76109.6846 | 1095709.557 |
| 68079.5019 | 67973.9097 | 63775.7592 | 1241868.641 |

FIG. 15

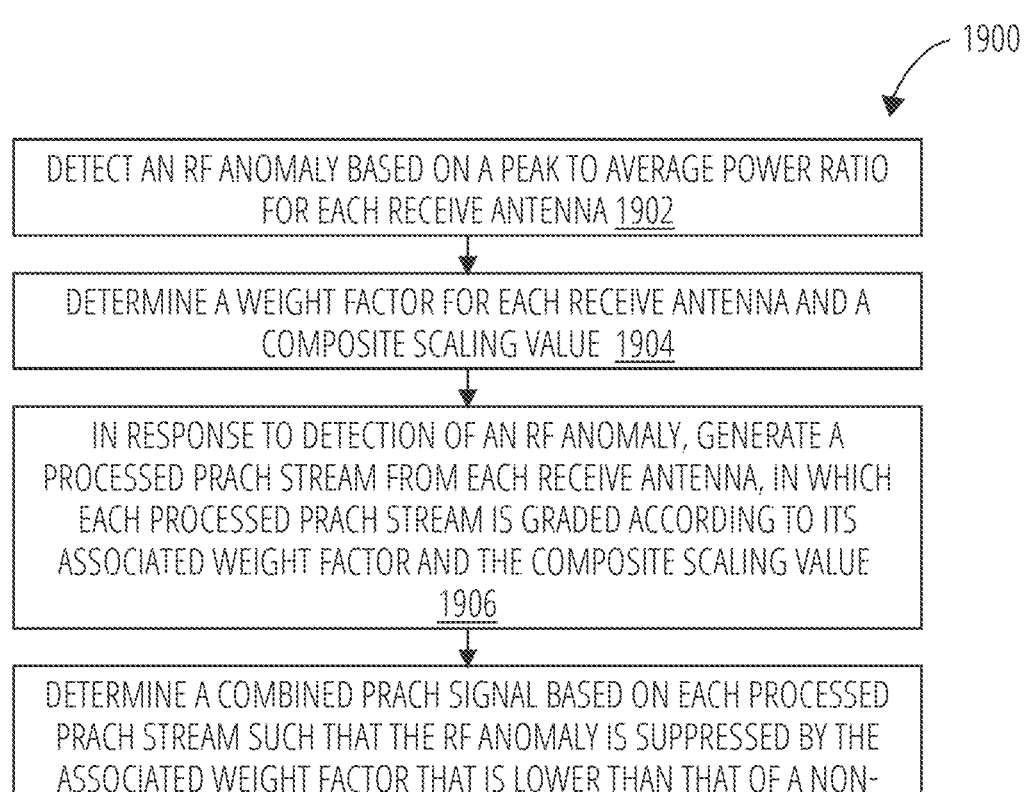

DETECT AN RF ANOMALY BASED ON A PEAK TO AVERAGE POWER RATIO FOR EACH RECEIVE ANTENNA 1902

DETERMINE A WEIGHT FACTOR FOR EACH RECEIVE ANTENNA AND A COMPOSITE SCALING VALUE 1904

IN RESPONSE TO DETECTION OF AN RF ANOMALY, GENERATE A PROCESSED PRACH STREAM FROM EACH RECEIVE ANTENNA, IN WHICH EACH PROCESSED PRACH STREAM IS GRADED ACCORDING TO ITS ASSOCIATED WEIGHT FACTOR AND THE COMPOSITE SCALING VALUE 1906

DETERMINE A COMBINED PRACH SIGNAL BASED ON EACH PROCESSED PRACH STREAM SUCH THAT THE RF ANOMALY IS SUPPRESSED BY THE ASSOCIATED WEIGHT FACTOR THAT IS LOWER THAN THAT OF A NON-ANOMALOUS PRACH SIGNAL 1908

FIG. 19

ANTENNA COMBINING FOR PHYSICAL RANDOM ACCESS CHANNEL (PRACH)

TECHNICAL FIELD

This disclosure generally relates to a PRACH and, more specifically, to improved PRACH reception.

BACKGROUND INFORMATION

The following paragraphs offer a summary of several United States patent documents. These documents describe attempts to enhance PRACH receiver technology.

U.S. Patent Application Publication No. 2021/0058822 A1 describes a proposed method aimed at improving the link budget for PRACH. This is achieved by transmitting multiple PRACH transmissions from a user equipment (UE) and then combining them.

U.S. Pat. No. 11,129,209 B2 describes a so-called cost-effective approach to PRACH detection. It involves a base station equipped with a radio device and at least one additional device. The radio device includes narrowband receivers connected to the elements of an antenna array. These receivers are designed to process signals from their respective antenna elements to produce symbols for a PRACH received. Additionally, accumulation circuitry is used to accumulate these symbols to output an averaged symbol for the PRACH, which is then processed by the additional device(s) for PRACH detection across one or more receive beams.

Lastly, U.S. Patent Application Publication No. 2021/0315022 A1 outlines a PRACH detection method and apparatus that involves a sequential detection of frequency domain data across multiple beam groups. It includes extracting frequency domain data corresponding to a PRACH, determining a time domain correlation peak, and then a first peak value based on this correlation. If the first peak value meets or exceeds a set threshold, a random access response message is sent to the user equipment.

While these patent documents propose various improvements to PRACH detection and processing, they share common deficiencies recognized by the present inventors.

SUMMARY OF THE DISCLOSURE

The current landscape of prior art reveals a gap in addressing the challenge of combining multiple receive streams, particularly when one or more streams may be compromised. The present inventors recognized that the previous attempts do not address particular anomalous PRACH signals attributable to issues such as a broken antenna, which can arise from various factors including damaged antenna elements, radio unit (RU) anomalies, or human error, and suboptimal channel conditions, which can significantly impact the performance and reliability of the PRACH reception.

Existing solutions also tend to rely on additional hardware components, which inevitably raises costs, or they focus on enhancing detection performance without resolving issues related to broken RF elements or antennas. This highlights the inventors' recognition of a need for an advanced antenna combining technique tailored for PRACH reception.

The technology described in this disclosure is capable of intelligently managing error scenarios, thereby contributing to the improvement of PRACH key performance indicators (KPIs). The techniques described herein are designed to optimize the extraction of information from incoming streams, which in turn bolsters PRACH detection performance.

The techniques described herein provide significant advantages. Firstly, they employ a dynamic weighting system for different antennas, assigning varying weights based on the properties of the signals they receive. This strategy amplifies the impact of strong signals, leading to a more effective combination of incoming streams and, consequently, enhanced detection performance. Secondly, the techniques are designed to assign minimal weights to faulty or bad streams, effectively isolating and disregarding them. This ensures that poor-quality streams do not detract from the overall system performance.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 8 is a table showing a first 23 rows for antenna data streams in accordance with one embodiment.

FIG. 9 is a table showing a first 23 rows for conventional and improved PRACH antenna combining in accordance with one embodiment.

FIG. 11 is a table showing a first 23 rows for combined repeats of the antenna data streams of FIG. 8.

FIG. 12 is a set of tables showing example thresholds and computations based on the antenna data streams of FIG. 8.

FIG. 13 is a table showing mask values in accordance with one embodiment.

FIG. 14 is a table showing temporary values after applying the mask values in accordance with one embodiment.

FIG. 15 is a table showing weighted and scaled values in accordance with one embodiment.

FIG. 19 is a flow diagram of a process for antenna combining in accordance with one embodiment.

DETAILED DESCRIPTION OF EMBODIMENTS

Unlike previous generations of mobile networks, 5G technology is expected to fundamentally transform the role that telecommunications technology plays in the industry and society at large. Thus, a 5G wireless communication system is expected to support a broad range of newly emerging applications on top of regular cellular mobile broadband services. These applications or the services that would be supported can be categorized into enhanced mobile broadband, massive deployment of internet of things (IoT) devices and ultra-reliable low latency communication. Using these devices, users could do video conference, television broadcast, and video on-demand (simultaneous streaming) applications using different types of multimedia services over internet, high speed browsing, voice call, gaming, connected car communications, etc.

Figure 1:
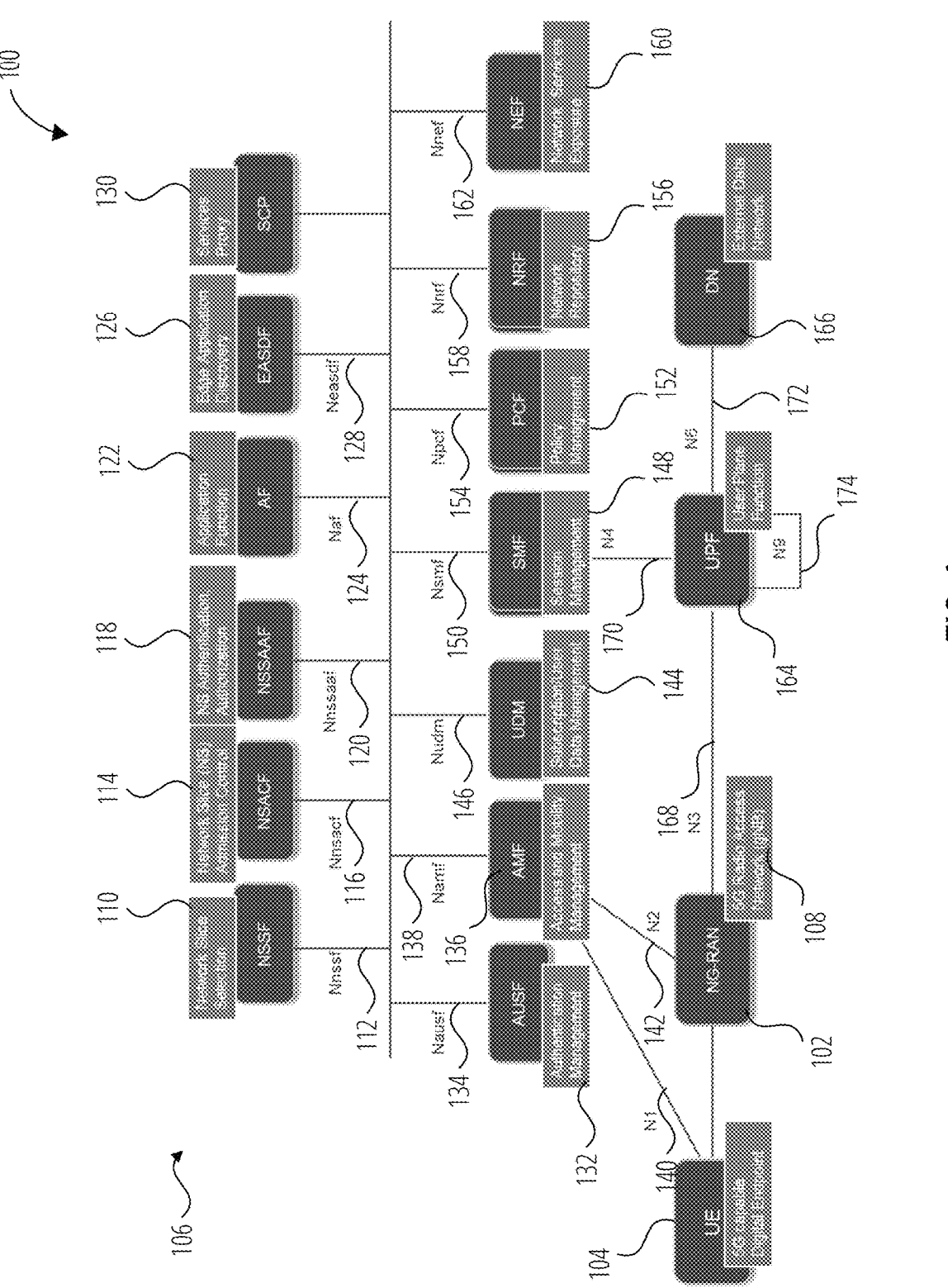
FIG. 1 is a block diagram of a 5G system architecture in accordance with one embodiment.

To support the above applications and services, 3GPP TS 38.300 describes a 5G system architecture 100, which is summarized in FIG. 1. The detailed descriptions of each of the network elements are provided below, but in summary, an NG-RAN 102 provides the 5G new radio's user plane and control plane protocol terminations towards a UE 104 (like smartphones and IoT devices). 5G system architecture 100 includes the radio base stations, antennas, and wireless technologies (such as massive MIMO and beamforming) that enable communication between UE 104 and a 5G core network (5GC) 106.

UE 104 may be smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, networked or "smart" appliances, MTC devices, M2M, IoT devices, and/or the like. In some embodiments, UE 104 may be an IoT UE, which may comprise a network access layer designed for low-power IoT applications utilizing short-lived UE connections. An IoT UE may utilize technologies such as M2M or MTC for exchanging data with an MTC server or device via a PLMN, ProSe or D2D communication; sensor networks; or IoT networks. The M2M or MTC exchange of data may be a machine-initiated exchange of data. An IoT network describes interconnecting IoT UEs, which may include uniquely identifiable embedded computing devices (within the internet infrastructure), with short-lived connections. The IoT UEs may execute background applications (e.g., keep-alive messages, status updates, etc.) to facilitate the connections of the IoT network.

RANs use a radio access technology (RAT) to communicate between the RAN node and UE. NG-RAN 102 implements 5G RAT. In certain deployments, an E-UTRAN may also implement 5G RAT (e.g., an ng-eNB that connects 5G UE 104 to 5GC 106 using 4G LTE air interface). Thus, NG-RAN is a term that encompasses both a 5G RAN and an evolved LTE RAN (eLTE RAN) as part of the 5G network architecture, designed to provide a unified and flexible RAN that supports both 5G NR and 4G LTE technologies. As used herein, the term "NG-RAN node" (or simply NG-RAN) refers to a RAN node that operates in an NR or 5G system. In 5G wireless RANs, RAN nodes may include a 5G NR node (also referred to as a next-generation Node B or gNodeB (gNB) 108). In this disclosure, 5G RAN refers to the NG-RAN or gNB.

5GC 106 implements a service-based architecture within 5G system architecture 100. On a right side of the dashed line are network functions and interfaces for 5GC 106. 5GC 106 is a cloud-native, service-based architecture that enables flexible and scalable network functions in 5G. 5GC 106 includes network functions (described below) configured to offer various data and telecommunications services to customers/subscribers (e.g., users of UE 104) connected to 5GC 106 via NG-RAN 102. The components of 5GC 106 may be implemented in one physical node or distributed across separate physical nodes including components to read and execute instructions from a machine-readable or computer-readable medium (e.g., a non-transitory machine-readable storage medium). In some embodiments, network function virtualization (NFV) may be utilized to virtualize any or all of the above-described network node functions via executable instructions stored in one or more computer-readable storage mediums (described in further detail below). A logical instantiation of 5GC 106 may be referred to as a network slice, and a logical instantiation of a portion of 5GC 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more 5GC components/functions. In the example of FIG. 1, 5GC 106 includes the following network functions and corresponding interfaces.

A network slice selection function (NSSF) 110 is responsible for selecting the appropriate network slice instance for a user based on subscription information, service requirements, and other factors. It helps allocate resources efficiently and manage network slices. Nnssf interface 112 is used to communicate network slice selection information and assistance data.

A network slice access control function (NSACF) 114 monitors and controls the number of registered UEs per network slice and/or the number of PDU sessions. Nnsacf interface 116 is the corresponding interface.

A network slice selection assistance function (NSSAAF) 118 creates a slice authentication context for UE 104, and starts the slice-specific authentication and authorization procedure. Nnssaaf interface 120 is the corresponding interface.

An application function (AF) 122 is an external application or service that interacts with 5GC 106. It can request network resources, provide traffic steering rules, or request Qos (Quality of Service) for specific applications. Naf interface 124 it is used for AF 122 to request policy control, QoS, or network resource information from a policy control function (PCF) or to interact with the network through a network exposure function (NEF), described below.

An edge application service discovery function (EASDF) 126 supports the session breakout connectivity model. EASDF 126 acts as a domain name system (DNS) resolver to UE 104 and can complement the DNS queries with UE location-related information. This enables the DNS system to resolve to application servers close to the UE location. Neasdf interface 128 is the corresponding interface.

A service communication proxy (SCP) 130 allows the control plane network to handle and prioritize massive numbers of requests in real time. SCP 130 provides a single point of entry for a cluster of network functions, once they have been successfully discovered by the network repository function (NRF), described below. This allows SCP 130 to become the delegated discovery point in a data center, offloading the NRF from the numerous distributed services meshes that would ultimately make up a network operator's infrastructure. Given the nature of SCP 130 as a proxy for communication between network functions, the interfaces it uses will depend on the specific network functions it connects.

An authentication server function (AUSF) 132 is responsible for user authentication and generating security keys. It verifies the user's credentials and ensures secure access to the network. Nausf interface 134 between AUSF 132 and an access and mobility management function (AMF) 136 is used to communicate authentication-related information and security key material.

AMF 136 manages access, mobility, and connection for user devices. It is responsible for registration, connection establishment, and handovers between different access networks. Namf interface 138 is between AMF 136 and other core network functions, such as the NSSF, unified data management (UDM), and session management function (SMF). It is used to exchange mobility, access, and session-related information. AMF 136 also has an N1 interface 140 with UE 104 and an N2 interface 142 with NG-RAN 102. AMF 136 hosts the following main functions (per 3GPP TS 23.501): NAS signaling termination; NAS signaling security; AS security control; inter CN node signaling for mobility between 3GPP access networks; idle mode UE reachability (including control and execution of paging retransmission); registration area management; support of intra-system and inter-system mobility; access authentication; access authorization including check of roaming rights; mobility management control (subscription and policies); support of network slicing; SMF selection; and selection of CIoT 5GS optimizations.

A UDM 144 stores and manages subscriber data, including authentication credentials, access profiles, and subscription information. It also provides this data to other network functions when needed. Nudm interface 146 is between UDM 144 and other core network functions, such as the AMF, AUSF, and PCF. It is used to communicate subscriber data, authentication credentials, access profiles, and policy information.

An SMF 148 manages user sessions, establishes and maintains data connections, and enforces policy control rules. It also ensures the correct routing of data traffic between the user device and external networks. Nsmf interface 150 is between the SMF and other core network functions, such as the AMF, user plane function (UPF), and PCF. It is used to exchange session, routing, and policy enforcement information. SMF 148 hosts the following main functions (per 3GPP TS 23.501): session management; UE IP address allocation and management; selection and control of user plane (UP) function; configuration of traffic steering at a UPF to route traffic to proper destination; the control part of policy enforcement and QoS; and downlink data notification.

A PCF 152 is responsible for making policy decisions, such as QoS and charging, based on subscription information and network conditions. It provides these decisions to other network functions for enforcement. Npcf interface 154 is between the PCF and other core network functions, such as the SMF, AF, and UDM. It is used for policy decision-making and to communicate policy rules and QoS information.

An NRF 156 maintains a repository of available network functions and their capabilities, enabling service discovery and load balancing among network functions. Nnrf interface 158 is between NRF 156 and other core network functions. It is used for service discovery, registration, and capability exposure among the network functions.

An NEF 160 exposes 5G network capabilities and resources to third-party applications and services. It provides a standardized API for external entities to interact with the network. Nnef interface 162 is between NEF 160 and other core network functions, such as AMF 136, SMF 148, and PCF 152. It is used to expose network resources, capabilities, and services to external applications and services through standardized APIs.

A UPF 164 is responsible for handling and forwarding user data traffic between UE 104 and external data networks (DN) 166, such as public internet, private networks, or other communication networks. UPF 164 performs various functions such as packet filtering, policy enforcement, and QoS management. An N3 interface 168, an N4 interface 170, and an N6 interface 172 connect UPF 164 to, respectively, NG-RAN 102, SMF 148, and DN 166. An N9 interface 174 is between two UPFs (i.e., the intermediate I-UPF and the UPF session anchor). UPF 164 hosts the following main functions (per 3GPP TS 23.501): Anchor point for Intra-/ Inter-RAT mobility (when applicable); external PDU session point of interconnect to DN 166; packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, and UL/DL rate enforcement; uplink traffic verification (SDF to QoS flow mapping); and downlink packet buffering and downlink data notification triggering.

Figure 2:
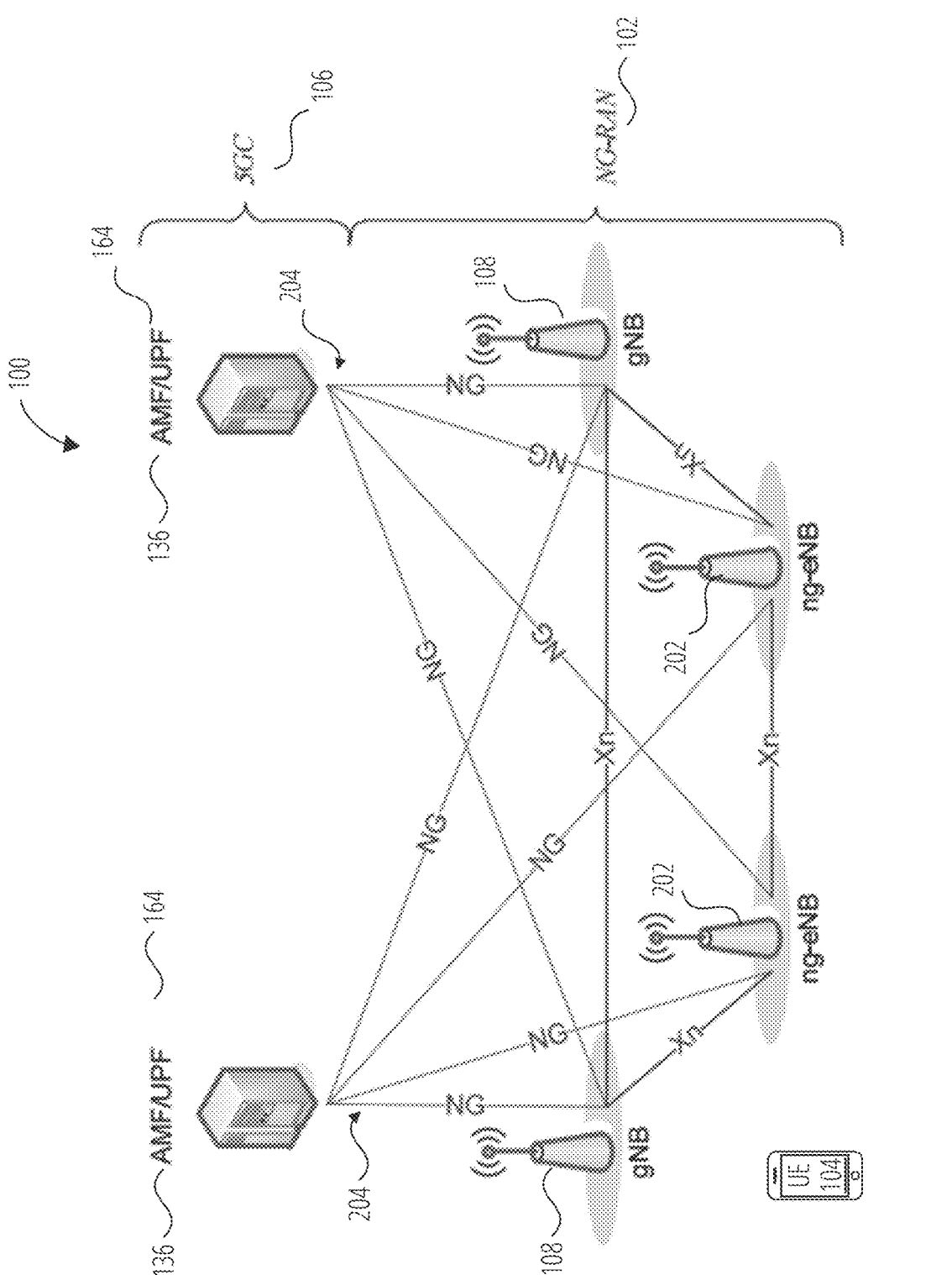
FIG. 2 is another block diagram of the 5G system architecture of FIG. 1.

FIG. 2 shows that gNBs 108 and ng-eNBs 202 are communicatively coupled to 5GC 106 by means of NG interfaces 204. More specifically, NG interfaces 204 include N2 interface 142 (FIG. 1) (NG-control) for a control plane connection to AMF 136. NG interface 204 also includes N3 interface 168 (FIG. 1) (NG-user) for a user plane connection to UPF 164.

The following functions are provided by each gNB 108 and ng-eNB 202: functions for radio resource management, including radio bearer control, radio admission control, connection mobility control, and dynamic allocation of resources to UEs in both uplink and downlink (scheduling); IP and ethernet header compression, encryption, and integrity protection of data; selection of AMF 136 at UE attachment when no routing to AMF 136 can be determined from the information provided by the UE; routing of user plane data towards UPF 164; routing of control plane information towards AMF 136; connection setup and release; scheduling and transmission of paging messages; scheduling and transmission of system broadcast information (originated from AMF 136 or OAM); measurement and measurement reporting configuration for mobility and scheduling; transport level packet marking in the uplink; session management; support of network slicing; QoS flow management and mapping to data radio bearers; support of UEs in RRC_INACTIVE state; distribution function for NAS messages;

radio access network sharing; dual connectivity; right inter-working between NR and E-UTRA; and maintenance of security and radio configuration for user plane CIOT 5GS optimizations, as defined in 3GPP TS 23.501. Also, ng-eNB 202 supports a bandwidth reduced low complexity (BL) UE, NB-IoT UE, or UE in enhanced coverage, per 3GPP TS 36.300.

Figure 3:
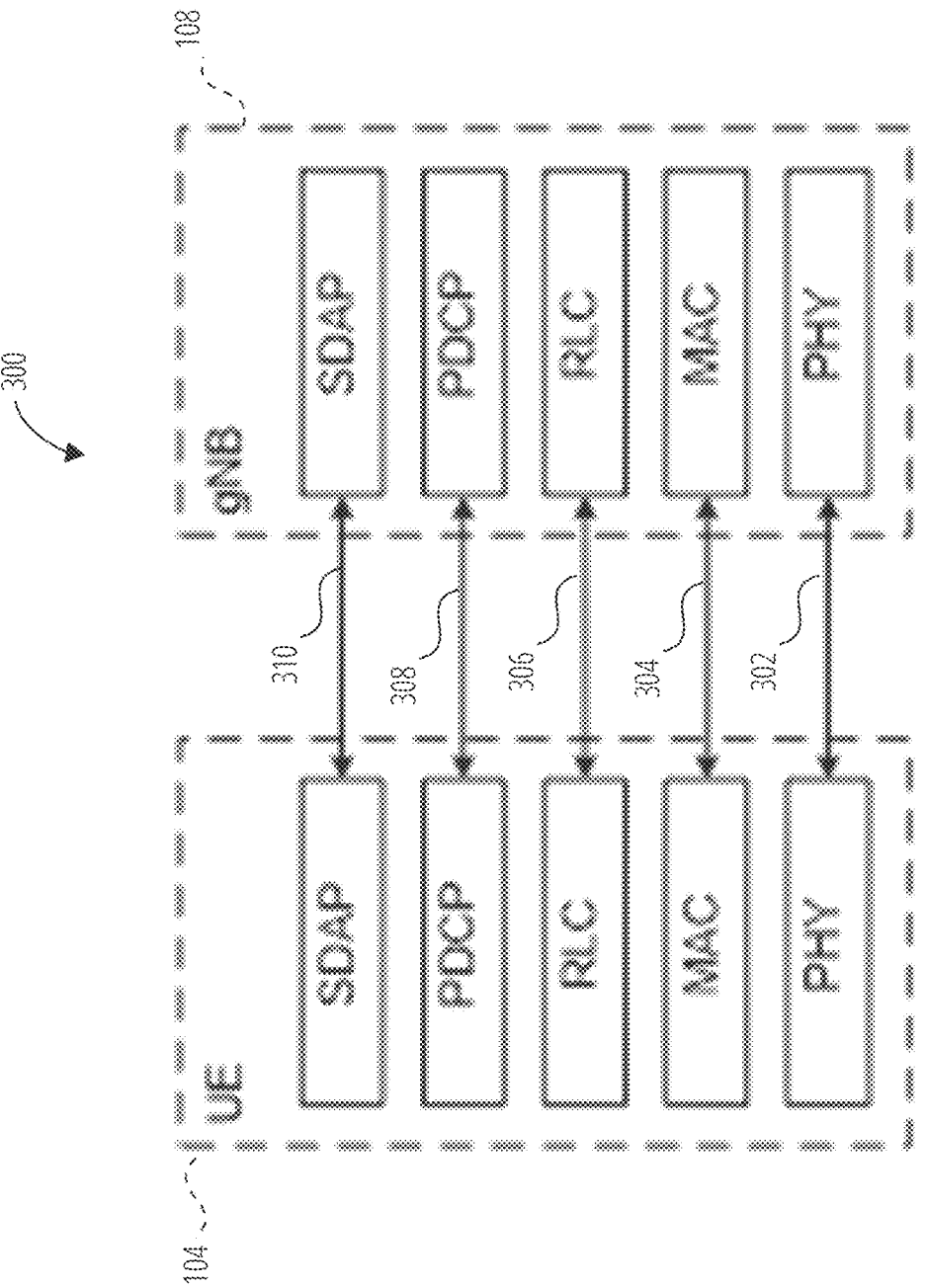
FIG. 3 is a block diagram of a user plane protocol stack in accordance with one embodiment.

3GPP TS 38.300 describes user plane communication between gNB 108 and UE 104 that happens through the wireless interface using a protocol stack 300 shown in FIG. 3. Protocol stack 300 for the user plane includes PHY sublayer 302, MAC sublayer 304, RLC sublayer 306, PDCP sublayer 308, and SDAP sublayer 310 that are part of the overall user plane or control plane layers that facilitate communication from UE 104 to the network core. Each of these sublayers are terminated at gNB 108 on the network side as well as at UE 104 on the user side.

A main protocol stack of FIG. 3 is PHY sublayer 302. PHY sublayer 302 hosts the following main functions, the details of which are described later with reference to FIG. 4: physical-layer processing for physical downlink shared channel (PDSCH); physical-layer processing for physical downlink control channels (PDCCH); physical-layer processing for synchronization signal and PBCH (SSB); physical-layer processing for physical uplink shared channel (PUSCH); physical-layer processing for physical uplink control channel (PUCCH); and physical-layer processing for physical random access channel (PRACH).

MAC sublayer 304 hosts the following main functions: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell of CA); priority handling between UEs by means of dynamic scheduling; priority handling between logical channels of one UE by means of logical channel prioritization; and padding.

RLC sublayer 306 hosts the following main functions: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; and protocol error detection (AM only).

PDCP sublayer 308 hosts the following main functions: sequence numbering; header compression and decompression (ROHC only); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; and duplication of PDCP PDUs (see subclause 16.1.3) and duplicate discard indication to lower layers.

SDAP sublayer 310 hosts the following main functions: mapping between a QoS flow and a data radio bearer; and marking QoS flow ID (QFI) in both DL and UL packets.

Figure 4:
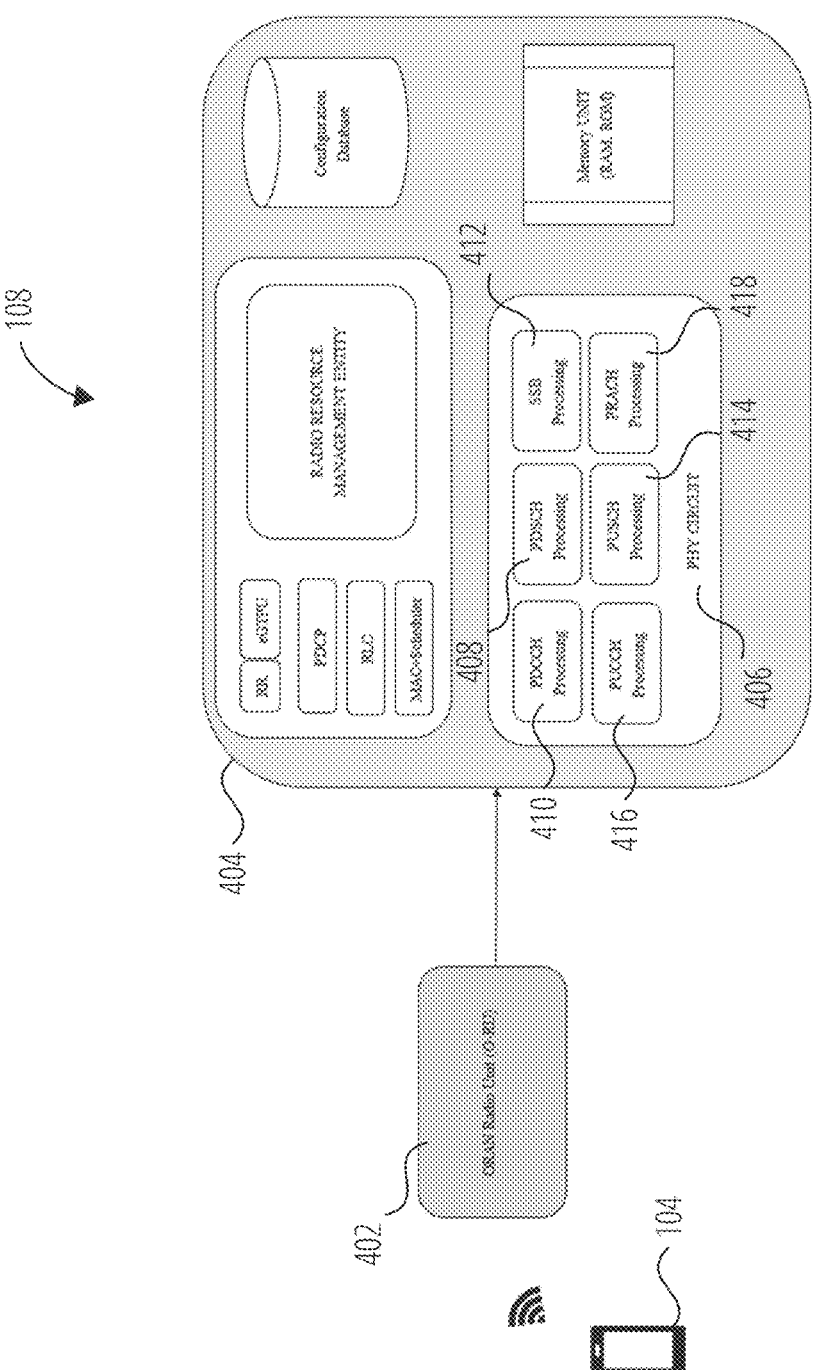
FIG. 4 is a block diagram of a gNB in accordance with one embodiment.

FIG. 4 shows an example implementation of an open RAN (O-RAN)-compliant gNB 108. An O-RAN is a dis-aggregated approach to deploying mobile fronthaul and midhaul networks built on cloud-native principles. O-RAN is an evolution of the Next Generation RAN (NG-RAN) architecture, first introduced in 3GPP release 15 (5G version 1) technical specification 38.401. The O-RAN Alliance formed to undertake the advancement of NG-RAN philosophies, expanding on the scope of what was originally outlined by the 3GPP. O-RAN architecture promotes open-ness, interoperability, and flexibility through standardized interfaces and modular components. In O-RAN systems, open interfaces are used for communication between components (e.g., between an O-RAN radio unit (O-RU) and an O-RAN distributed unit (O-DU), between the O-DU and an O-RAN central unit (O-CU)). Communication protocols for these open interfaces may be publicly defined, in contrast to proprietary interfaces, to enable components from a variety of different entities or vendors to seamlessly interact.

O-RAN architectures may include one or more O-RUs, one or more O-DUs, and an O-CU. An O-RU transmits and receives radio signals to and from user devices (e.g., user equipment (UE)). An O-RU converts digital data to be transmitted to user devices to radio signals, and converts radio signals from the user devices to digital data. An O-DU may process radio signals from one or more O-RUs and forward the processed data to a core network. An O-CU may handle higher-level functions (e.g., radio resource management, coordination of one or more O-DUs, and interfacing with the core network).

As seen in FIG. 4, gNB 108 includes a fronthaul split between an O-RU 402 and an O-DU 404, which may optionally include an O-CU. In some embodiments, an O-DU and an O-CU are also split (e.g., in a split 7.2x). Other functional splits are also possible. Furthermore, the disclosed techniques may be implemented in a gNB (gNB-DU) or virtualized system.

In the example of gNB 108, O-DU 404 includes a PHY circuitry 406 for processing PHY sublayer 302 (FIG. 3). In PHY circuitry 406, there is circuitry configured for PDSCH processing 408, PDCCH processing 410, SSB processing 412, PUSCH processing 414, PUCCH processing 416, and PRACH processing 418.

PDSCH processing 408 entails the following functions: transport block CRC attachment; code block segmentation and code block CRC attachment; channel coding (LDPC coding); physical-layer hybrid-ARQ processing; rate match-ing; scrambling; modulation (QPSK, 16 QAM, 64 QAM and 256 QAM); layer mapping; and mapping to assigned resources and antenna ports.

PDCCH processing 410 entails the following: downlink assignments containing at least modulation and coding format, resource allocation and hybrid-ARQ information relate to DL-SCH; uplink scheduling grants containing at least modulation and coding format, resource allocation and hybrid-ARQ information related to UL-SCH. In addition to scheduling, PDDCH can be used for: activation and deac-tivation of configured PUSCH transmission with configured grant; activation and deactivation of PDSCH semi-persistent transmission; notification of one or more UEs of the slot format; notification of one or more UEs of the PRB(s) and OFDM symbol(s) where the UE may assume no transmis-sion is intended for the UE; transmission of TPC commands for PUCCH and PUSCH; transmission of one or more TPC commands for SRS transmission by one or more UEs; switching of a UE's active bandwidth part; and initialing of a random access procedure.

SSB processing 412 for a synchronization signal and PBCH (SSB) entails primary and secondary synchronization signals (PSS, SSS) and broadcast information.

PUSCH processing 414 entails transport block CRC attachment; code block segmentation and code block CRC attachment; channel coding (LDPC coding); physical-layer hybrid-ARQ processing; rate matching; scrambling; modu-lation ($\chi/2$ BPSK with transform precoding only, QPSK, 16

QAM, 64 QAM and 256 QAM); layer mapping, transfer precoding (enabled/disabled by configuration) and precoding; and mapping to assigned resources and antenna ports.

PUCCH processing 416 entails processing for different formats of uplink transmissions.

Format #0: Short PUCCH of one or two symbols with small UCI payloads of up to two bits with UE multiplexing capacity of up to six UEs with one-bit payload in the same PRB.

Format #1: Long PUCCH of 4-14 symbols with small UCI payloads of up to two bits with UE multiplexing capacity of up to 84 UEs without frequency hopping and three UEs with frequency hopping in the same PRB.

Format #2: short PUCCH of one or two symbols with large UCI payloads of more than two bits with no UE multiplexing capability in the same PRBs.

Format #3: Long PUCCH of 4-14 symbols with large UCI payloads with no UE multiplexing capability in the same PRBs.

Format #4: Long PUCCH of 4-14 symbols with moderate UCI payloads with multiplexing capacity of up to four UEs in the same PRBs.

The short PUCCH format of up to two UCI bits is based on sequence selection, while the short PUCCH format of more than two bits frequency multiplexes UCI and DMRS. The long PUCCH formats time-multiplex the UCI and DMRS. Frequency hopping is supported for long PUCCH formats and for short PUCCH formats of duration of two symbols. Long PUCCH formats can be repeated over multiple slots.

UCI consists of the following information: CSI, ACK/NACK, and scheduling request. UCI multiplexing in PUSCH is supported when UCI and PUSCH transmissions coincide in time, either due to transmission of UL-SCH transport block or due to triggering of A-CSI transmission without UL-SCH transport block: UCI carrying HARQ-ACK feedback with one or two bits is multiplexed by puncturing PUSCH; and in all other cases, UCI is multiplexed by rate matching PUSCH.

PRACH processing 418 for random access entails the following: random access preamble sequences of two different lengths are supported, e.g., 139 and 839; multiple PRACH preamble formats are defined with one or more PRACH OFDM symbols, and different CP and guard time; and the PRACH preamble configurations to use are provided to UE 104 in the system information. These configurations are obtained by extending the random access configurations defined for UEs via scaling the periodicity and/or offsetting the time domain position of the RACH occasions. UE 104 calculates the PRACH transmit power for the retransmission of the preamble based on the most recent estimate pathloss and power ramping counter. The system information provides information for UE 104 to determine the association between the SSB and the RACH resources.

Whenever the user traffic data from DN 166 (FIG. 1) needs to be sent to UE 104, it passes through UPF 164 and gNB 108 and reaches UE 104 in the downlink direction and vice-versa for the uplink direction. In order to schedule the user's traffic data in downlink direction or vice-versa, UE 104 should be in RRC_CONNECTED state. For RRC_CONNECTED state, one main PHY sublayer 302 (FIG. 3) functionality that comes in consideration is physical-layer processing for PRACH.

As defined in 3GPP TS 38.300, random access procedure is triggered by a number of events: initial access from RRC_IDLE; RRC connection re-establishment procedure;

DL or UL data arrival during RRC_CONNECTED when UL synchronization status is "non-synchronized"; UL data arrival during RRC_CONNECTED when there are no PUCCH resources for SR available; SR failure; request for RRC upon synchronous reconfiguration (e.g. handover); transition from RRC_INACTIVE; establishing time alignment for a secondary TAG; request for other SI (see clause 7.3); beam failure recovery; or consistent UL LBT failure on SpCell.

Multiple types of random-access procedures are supported per 3GPP TS 38.300. All of them require random-access preamble transmission on PRACH. Random access preamble transmission over PRACH happens through the cyclic prefix based on the orthogonal frequency division multiplexing (CP-OFDM), which uses physical resources blocks (PRB) to send the random-access preamble.

There are three parameters defined in 3GPP TS 38.211 with respect to resources which can be used by PRACH. These parameters are: (1) prach-ConfigurationIndex, (2) msg1-FrequencyStart, and (3) msg1-FDM.

3GPP TS 38.211 also specifies that 64 different random-access preambles are defined in each time-frequency PRACH occasion. These 64 preambles are enumerated in increasing order based on two parameters. First in terms of increasing cyclic shift within a given root sequence and second in terms of increasing logical root sequence index. Parameter prach-RootSequenceIndex is defined to get the starting root sequence index. The cyclic shift is controlled by parameters called zeroCorrelationZoneConfig and restrictedSetConfig.

Figures 5, 6:
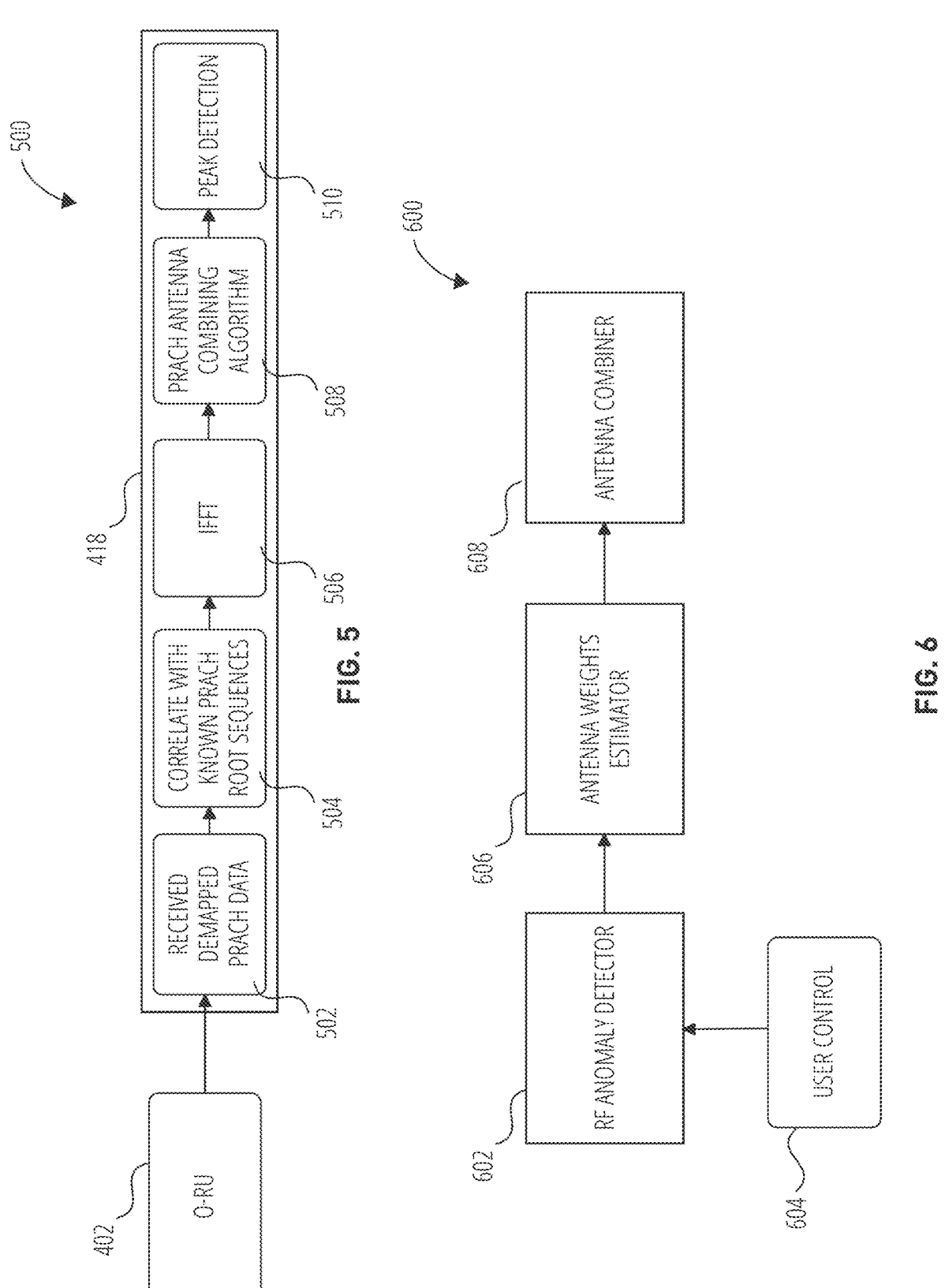
FIG. 5 is a flow diagram for a gNB-O-DU PRACH receiver process in accordance with one embodiment.
FIG. 6 is a block diagram of a system for antenna combining in accordance with one embodiment.

FIG. 5 depicts a process 500 for PRACH processing 418. PRACH processing 418 includes multiple sub-components. When receiving demapped PRACH data 502, the frequency domain data is given by O-RU 402 after removing the cyclic prefix. Correlating frequency domain data with known root sequence(s) 504 entails correlation of incoming frequency domain data with known root sequence(s), which can be possibly transmitted by UE 104. IFFT 506 does an IFFT of correlated data in order to get the correlation peak in time-domain. Antenna combining 508 entails combining multiple receive antenna streams in order to improve the detection probability. Peak detection 510 searches and identifies if any random-access preamble is transmitted by UE 104.

In the absence of proper channel information and estimation at the receiver, traditional antenna combining methods employ simple averaging of all antenna streams. In such systems, where multiple antenna streams are getting combined together by simple averaging, overall system performance may degrade if one or more antenna streams goes bad because of damaged components of O-RU 402. Such components may include broken antenna, damaged ports, loose connections, and human error. If one or more antennas is broken, averaging will bring down the peak value of working antenna(s), which may result into missed preamble ID (PID) detection. It will summarily degrade the system performance and reliability.

Instantaneous power may vary in bad channel conditions at the input of one or more antennas. This might result in antenna streams that are not as good as other ones for that instant. This also can contribute to degraded performance even in the scenarios where no antenna is damaged.

To address the antenna problem and use the incoming signal in the most effective way, this disclosure describes an improved antenna combining technique, which results in improving the PRACH detection capabilities. In general, the improvement entails detection of bad antenna streams; grading of antenna streams if any bad antenna streams are detected; and user control for varying the sensitivity of the mechanism. FIG. 6, for example, provides an overview of an intelligent and robust system 600 for antenna combining. Improved PRACH antenna combining (IPAC) may be implemented in gNB 108.

Initially, system 600 includes an RF anomaly detector 602, which detects whether the incoming streams are good or not. RF anomaly detector 602 may detect events related to RF hardware-layer anomalies such as faulty antenna, loose connections, failure of integrated amplification and optoelectronics in remote fiber antenna system, and various other RF hardware-based events. In other embodiments, RF anomaly detector 602 detects channel-level fluctuation and other such events in the received PRACH signals.

RF anomaly detector 602 uses the properties of the CAZAC sequences (Zadoff-Chu sequence described in 3GPP TS 38.211), i.e., zero auto-correlation and good cross-correlation properties. Auto-correlation for CAZAC sequence is non-zero only at one instant which corresponds to a cyclic shift. This property leads to a peak in the correlation output whenever some valid PRACH signal is present. RF anomaly detector 602 uses the above-mentioned property of the CAZAC sequence to know if there is any valid PRACH signal present in the incoming streams and check the relative difference in the signal properties across different antenna streams. If the relative difference across the different antenna streams crosses a user-configurable faulty-stream detection threshold, then it can be concluded that one or more antenna streams are bad with respect to the best antenna stream. Those bad streams, if combined as is, would degrade the PRACH detection performance of the system.

System 600 also includes user control 604 to receive other user-configurable thresholds, which are used for determining the bad antenna streams. A PRACH-peak_threshold is based on a lookup table. A faulty-stream detection threshold is communicated through an L1 XML file, which is read by the L1/PHYsical layer when L1 comes up. Based on the noise properties of the system, an operator would calibrate the system and finalize a threshold value. As explained later, these thresholds are checked by RF anomaly detector 602 to identify faulty streams.

Once any broken/bad antenna streams are detected, antenna weights estimator 606 accesses the signal properties of each antenna stream and assigns weights accordingly. If any stream has good signal properties, then it will get more weight and vice-versa. Antenna weights estimator 606 assigns equal weights to all streams if no bad/broken antenna streams are detected.

Finally, antenna combiner 608 does a final antenna combining based on the assigned weights and gives the combined output to the next blocks in the chain for further processing.

Figure 7:
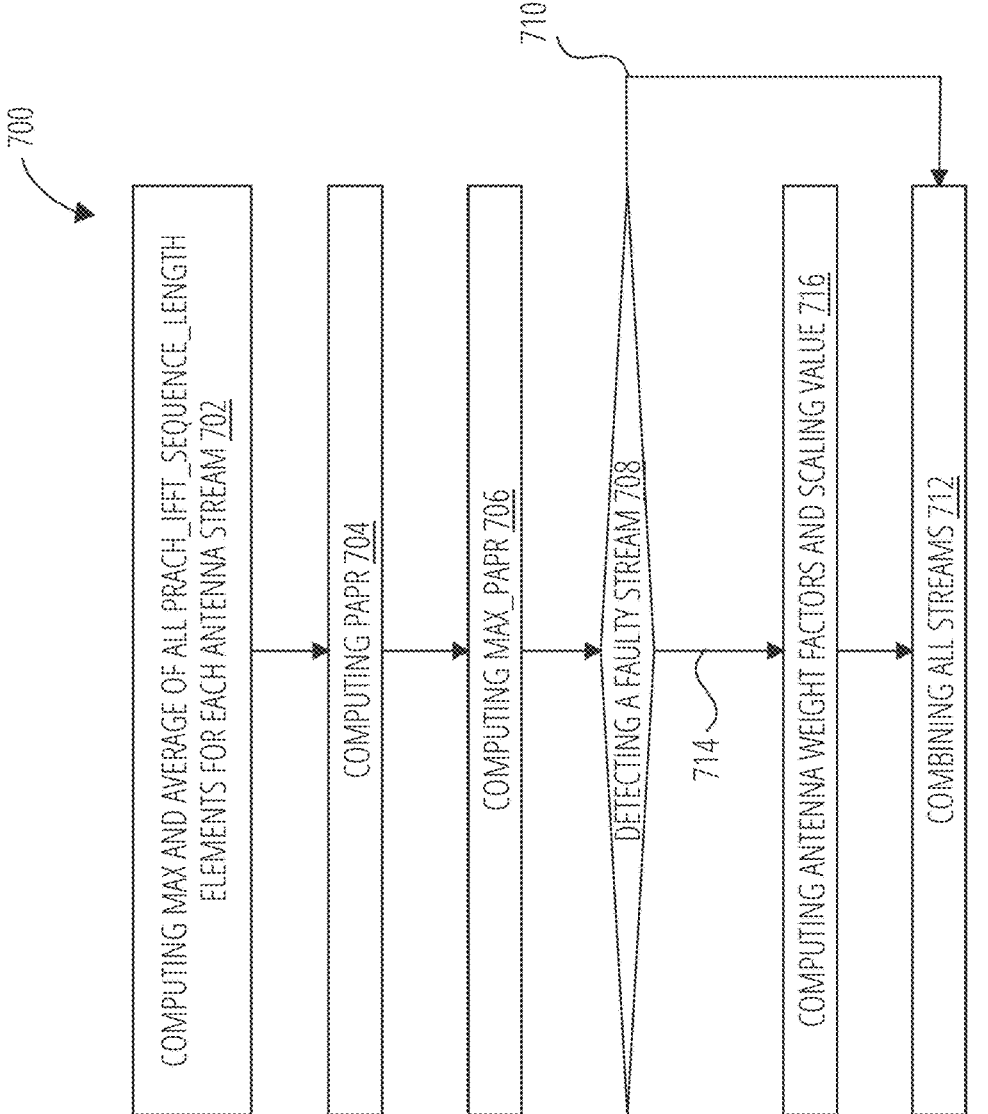
FIG. 7 is a flow diagram for a process of antenna combining in accordance with one embodiment.

FIG. 7 shows in greater detail an antenna combining process 700 performed by system 600. Examples of data for process 700 are provided in FIG. 8-FIG. 10. PRACH antenna combining process 700 does the combining of all repeats and all antennas after correlation and IFFT. Parameters for process 700 are as follows:

| Name | Description |
|---|---|
| nRepeat | Number of repeats |
| PRACH_IFFT_Sequence_length | PRACH length after IFFT out (1024 or 2048 or any other IFFT length) |
| nRA | Number of receive antennas |

-continued

| Name | Description |
|---|---|
| pIn | Complex input of length PRACH_IFFT_Sequence_length × nRepeat × nRA |
| pOut | Output buffer of length PRACH_IFFT_Sequence_length |
| i | Sample index to traverse from one to PRACH_IFFT_Sequence_length |
| j | Antenna index to traverse from one to nRA |
| k | Repeat index to traverse from one to nRepeat |

Initially, FIG. 8 shows a first 23 of 12,288 (1,024×12) rows of pIn. Based on pIn, a conventional antenna combining process generates pOut as follows:

$$pOut(i) =$$

$$\frac{1}{nRA \times nRepeat} \sum_{j=1}^{nRA} \sum_{k=1}^{nRepeat} \text{abs}(pIn\,(i + j * nRA * nRepeat + k * nRepeat))^2$$

Figure 10:
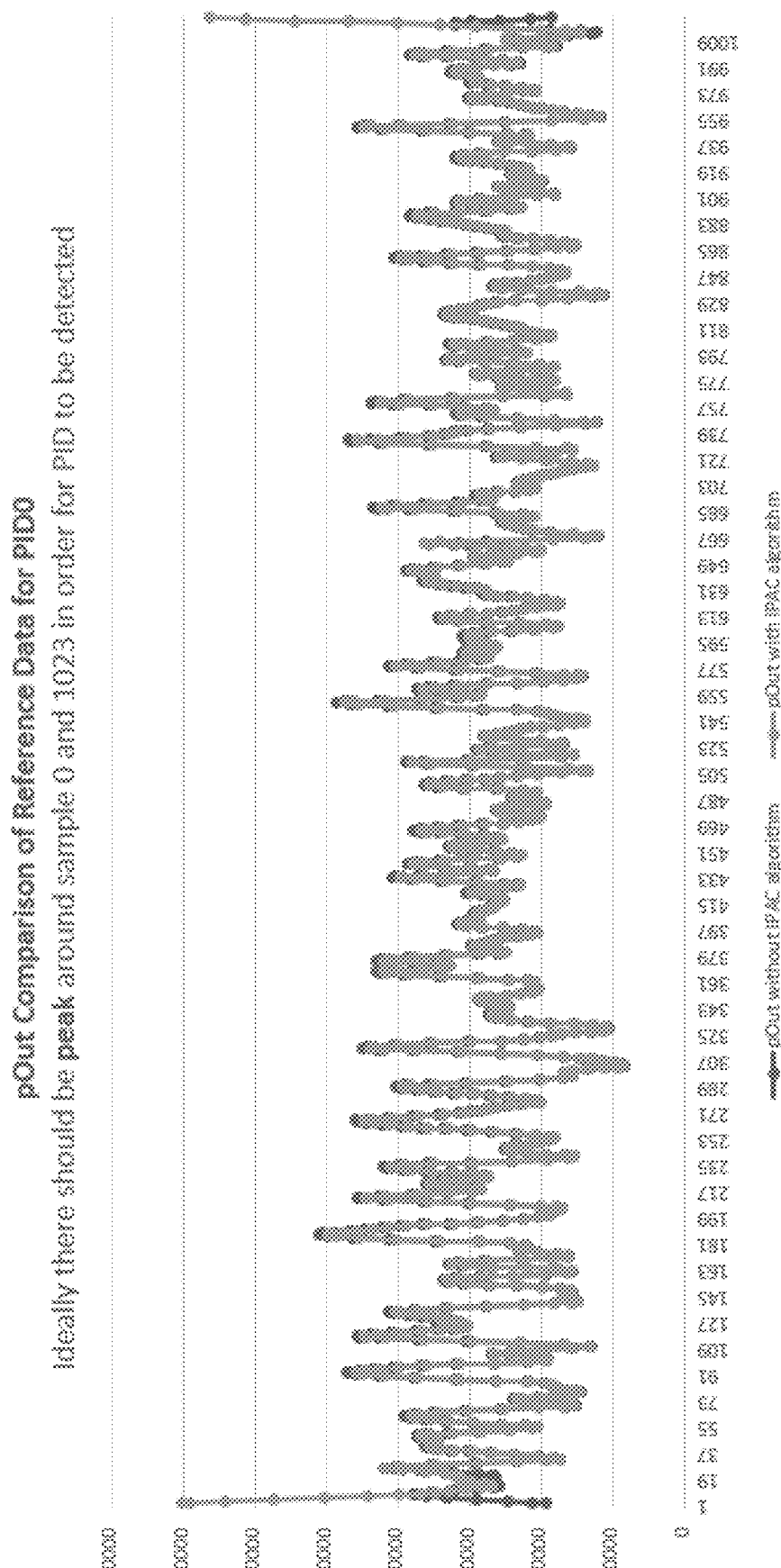
FIG. 10 is a graph showing all 1,024 rows for the conventional and improved PRACH antenna combining data corresponding to FIG. 9.

FIG. 9 shows in its left-side column a first 23 of 1,024 rows of the conventional pOut calculation. FIG. 10 also plots this data. The first and last samples of FIG. 10 show values that are relatively low. In contrast, FIG. 9 and FIG. 10 show pOut following IPAC process 700, with FIG. 10 showing peaks around the first and last samples.

Process 700 begins by computing Max and Avg 702 max and average of all elements (PRACH_IFFT_Sequence_length) for each antenna stream, which is initially based on the following equation:

$$pIn\_repeat\_combined(i, j) =$$

$$\frac{1}{nRepeat} \sum_{k=1}^{nRepeat} \text{abs}(pIn(i + j * nRA * nRepeat + k * nRepeat))^2$$

FIG. 11 shows a first 23 of 1,024 rows of pIn_repeat_combined. The max and average are then calculated as follows:

$$\text{Max}(j)=\max(pIn\_repeat\_combined(i,j))$$

$$\text{Avg}(j)=\text{mean}(pIn\_repeat\_combined(i,j))$$

FIG. 12 shows an example Max(j) and Avg(j) among all rows (not shown) for pIn_repeat_combined of FIG. 11.

Next, process 700 entails computing papr 704, which is a peak to average power ratio for all antennas. This computation is based on the following equations:

$$papr(j) = \frac{\text{Max}(j)}{\text{revised\_avg}(j)}$$

$$\text{revised\_avg}(j) = \frac{\sum_{i=1}^{PRACH\_IFFT\_Sequence\_length} pTemp(i, j)}{\sum_{i=1}^{PRACH\_IFFT\,Sequence\_length} \text{mask}(i, j)}$$

$$pTemp(i, j) = pIn\_repeat\_combined(i, j) * \text{mask}(i, j)$$

13

-continued $$mask(i, j) =$$

$$pIn\_repeat\_combined(i, j) > Avg(j) * PRACH\_peak\_threshold ? 0{:}1$$

FIG. 12 also shows examples of papr(j) and revised_avg (j). FIG. 13 shows mask (first 23 rows). FIG. 14 shows pTemp (first 23 rows).

Next, process 700 entails computing max_papr 706 as follows, an example of which is also shown in FIG. 12:

$$max\_papr = max(papr(j))$$

Process 700 then entails detecting a faulty stream 708, which corresponds to RF anomaly detector 602 (FIG. 6). Detecting a faulty stream 708 includes normalizing the papr by a max papr to generate a normalized value that is compared with a user-configurable faulty-stream detection threshold (which may be empirically derived). Another comparison entails comparing the max papr to the PRACH-peak threshold. A bad/faulty antenna stream detected with the following check is true:

$$\text{for } j =$$

$$1 : nRA \ldots \text{if } \left[\left(\frac{papr(j)}{max\_paper} < faulty\_stream\_detection\_threshold\right) \&\&\right.$$

$$\left.(max\_papr > PRACH\_peak\_threshold)\right]$$

FIG. 12 shows a result for detecting a faulty stream 708, in which Ant3 is determined to be associated with a faulty stream. Examples for the two thresholds are also shown in the upper table of FIG. 12. The first inequality condition finds an antenna stream that is faulty (Ant3, in FIG. 12). The second inequality condition determines whether at least one antenna stream has an actual signal—if they all have noise (i.e., below the PRACH-peak threshold), then there is no faulty stream irrespective of what the first inequality condition shows since this second criteria would be '0' and logically ANDed with the first criteria.

As noted previously, the two thresholds may be empirically determined values. The PRACH-peak threshold depends on factors such as the number of repetitions, number of antennas, preamble format type, and the like, and it can vary roughly in the range from about 4 to about 17, depending on these factors. Lower values may cause false noisy peaks getting identified as PRACH signal peaks whereas higher values might result in miss of actual PRACH peak. The faulty-stream detection threshold may depend on the type of noisy signal. Typical range is about 0.15 to about 0.25. Higher values may cause this algorithm to elevate noise peaks, which might cause false alarms in the system. Lower values might miss the detection of faulty streams in some scenarios.

If there are no faulty streams 710, then process 700 entails combining all streams 712, which corresponds to antenna combiner 608 (FIG. 6). Combining all streams 712 is based on the following equation:

$$pOut(i) = \frac{1}{nRA} \sum_{j=1}^{nRA} pIn\_repeat\_combined(i, j)$$

If there is a faulty stream 714, process 700 then entails computing antenna weight factors and scaling value 716, which corresponds to antenna weights estimator 606 (FIG. 6). Computing antenna weight factors and scaling value 716 represents a grading (based on a corresponding weight and the scaling) applied to each of the processed antenna streams. For instance, step 716 includes calculating a proportion of peak to average power ratio for each receive antenna (e.g., by dividing a papr by the sum of all paprs) and multiplying each proportion by the total number of receive antennas. Step 716 may include computing a scaling factor by determining a collective average of each receive antenna average peak to average power ratio, determining a collective weighted average of each receive antenna average peak to average power ratio, and dividing the collective average by the collective weighted average. The computations for step 716 are based on the following equations, examples of which are also shown in FIG. 12:

$$Antenna\_weights(j) = \left(\frac{papr(j)}{\sum_{j-1}^{nRA} papr(j)}\right) * nRA$$

$$Old\_avg = \frac{\sum_{j-1}^{nRA}(Avg(j))}{nRA}$$

$$New\_avg = \frac{\sum_{j-1}^{nRA}(Avg(j) * Antenna\_weights(j))}{nRA}$$

$$Scaling\_factor = \frac{Old\_avg}{New\_avg}$$

FIG. 15 shows an example of how these weights and scaling are applied to pIn_repeat_combined, based on the following equation:

pIn_repeat_combined_weight_applied(i,j)=
Antenna_weights(j)*pIn_repeat_combined
(i,j)*Scaling_Factor Finally, process 700 entails combining all streams 712, but using the weighted and scaled pIn_repeat_combined_weight_applied values in response to faulty stream 714. A right-side column of FIG. 9 shows an example of the following calculation:

$$pOut(i) = \frac{1}{nRA} \sum_{j=1}^{nRA} pIn\_repeat\_combined\_weight\_applied(i, j)$$

Figure 16:
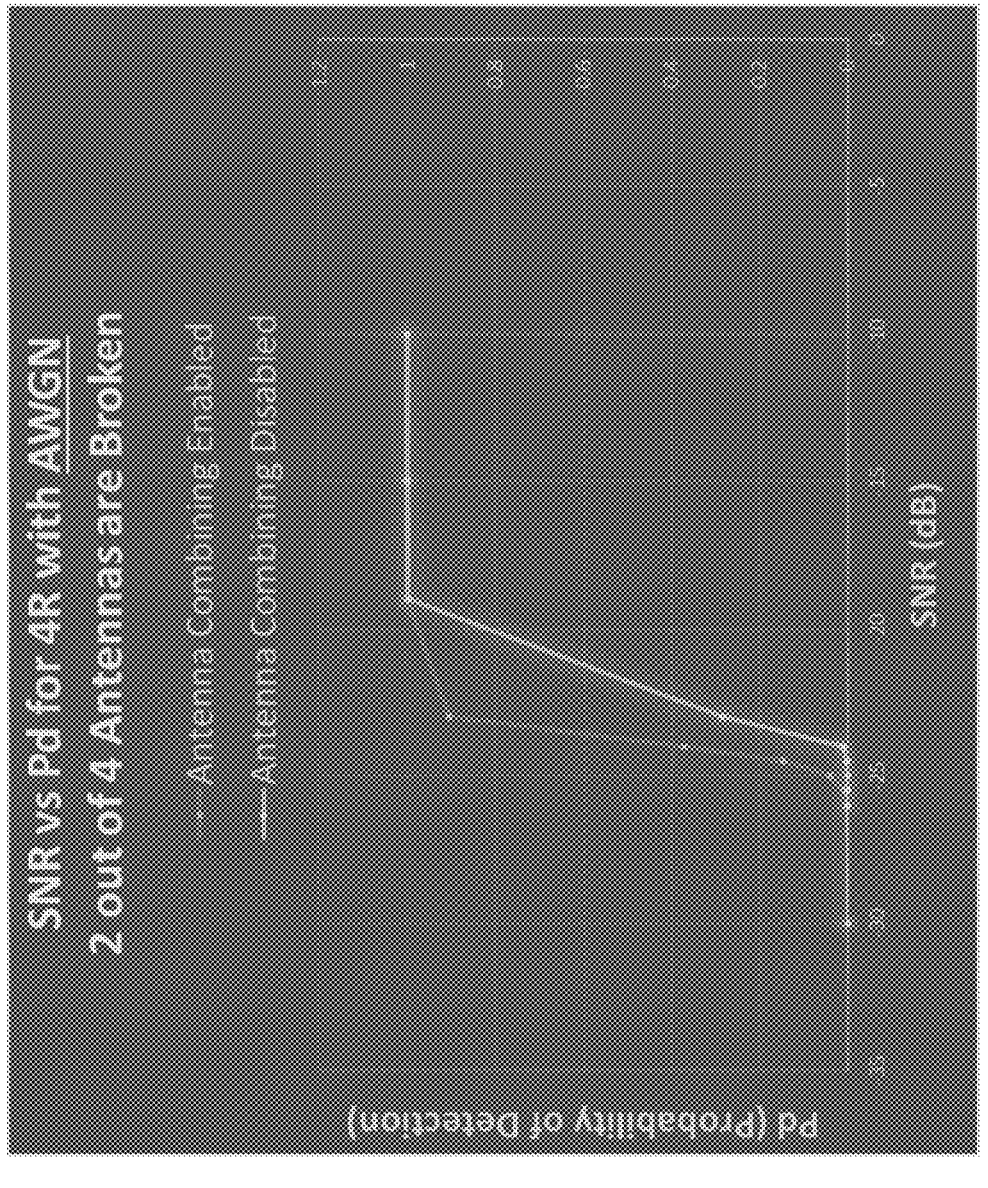
FIG. 16 is a plot of SNR vs. probability of detection simulation in accordance with one embodiment.
Figure 17:
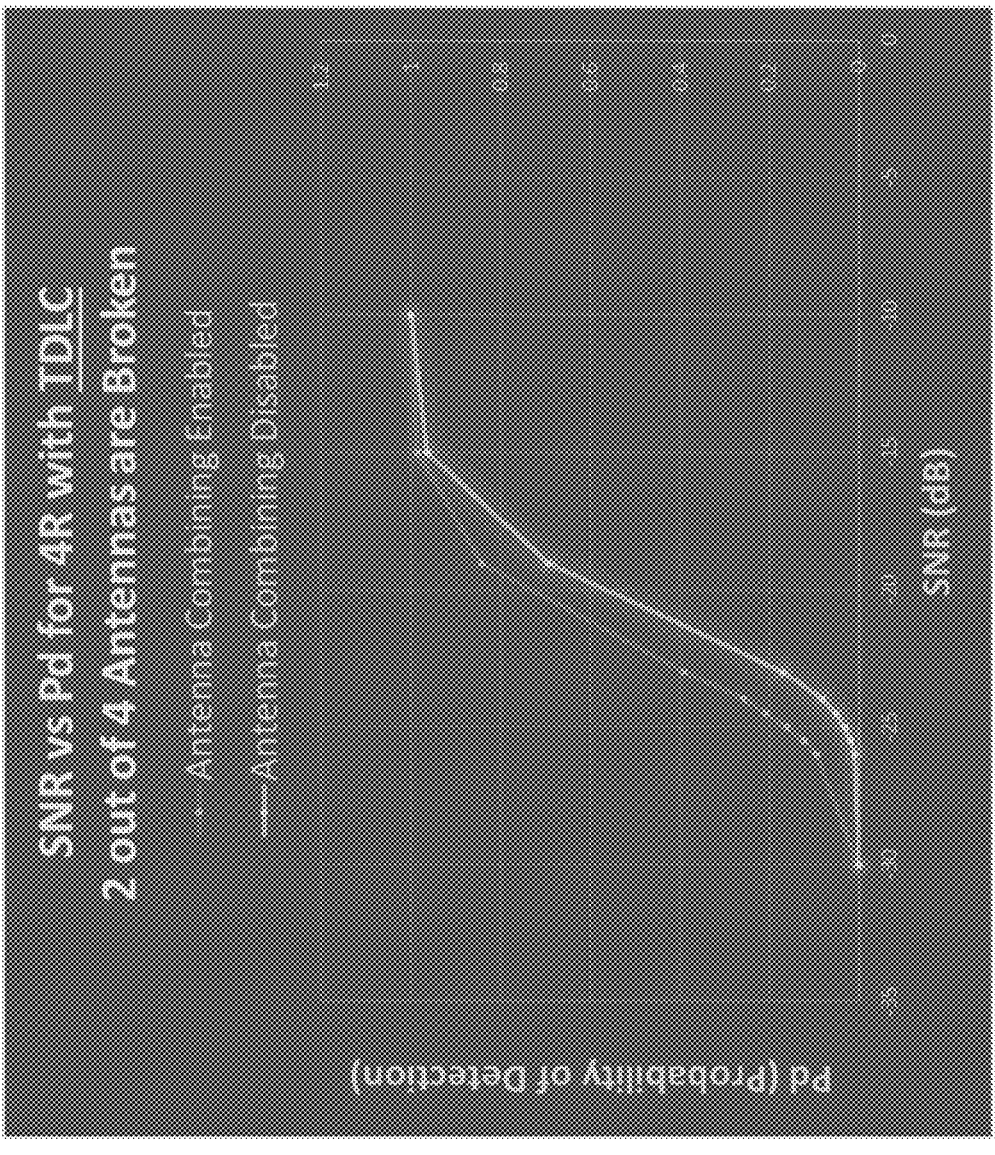
FIG. 17 is a plot of SNR vs. probability of detection simulation in accordance with one embodiment.
Figure 18:
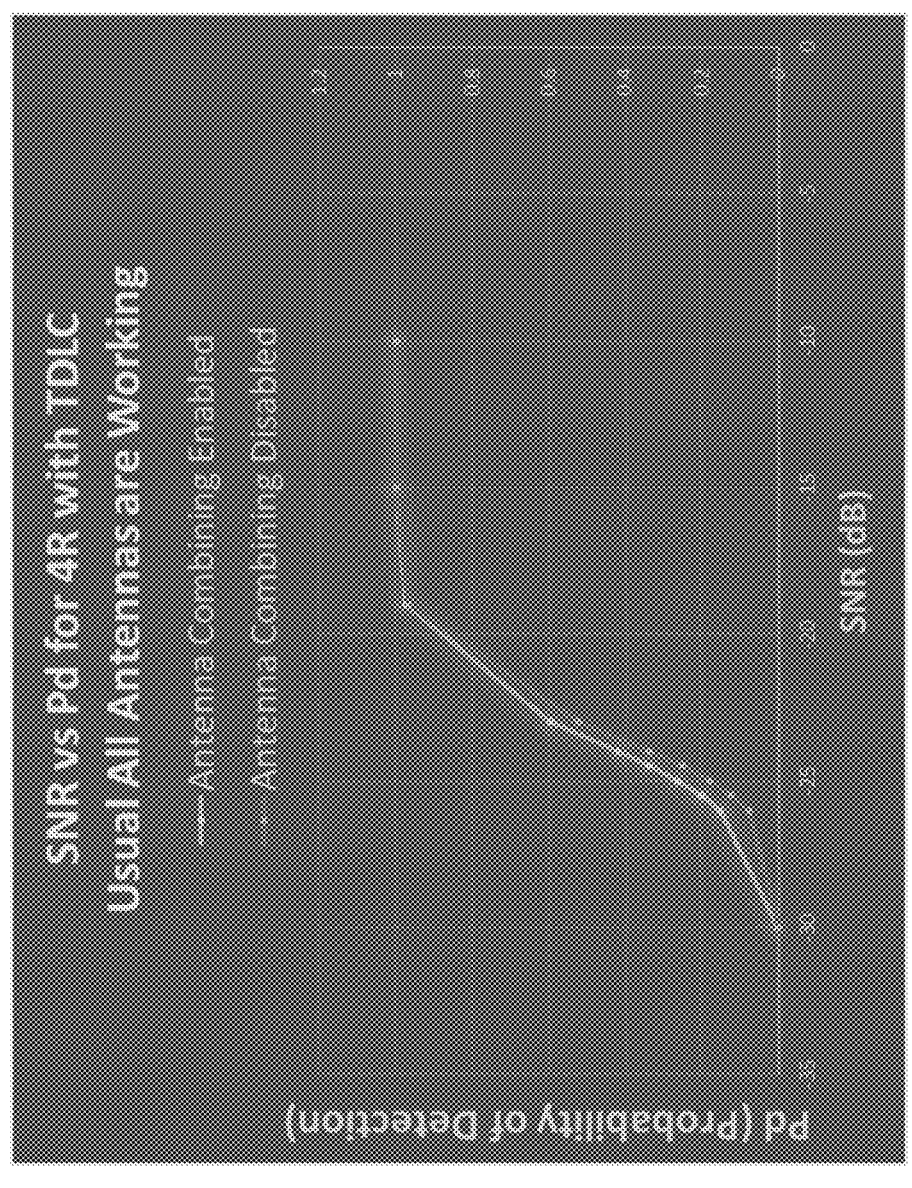
FIG. 18 is plot of SNR vs. probability of detection simulation in accordance with one embodiment.

FIG. 16-FIG. 18 show simulation results for about 10,000 slots where PRACH is being transmitted by a mobile/UE simulator to observe the detection performance with process 700. In FIG. 16 and FIG. 17, it can be observed that when two out of four antennas are broken, IPAC gives a gain of up to 2 dB at a lower SNR for similar detection performance. FIG. 18 shows a gain of up to 0.5 dB was observed when all the antennas are working fine in the TDLC channel.

FIG. 19 shows a process 1900 for antenna combining in a PRACH receiver so as to increase PRACH detection probability. In block 1902, process 1900 detects an RF anomaly based on a peak to average power ratio for each receive antenna. In block 1904, process 1900 determines a weight factor for each receive antenna and a composite scaling value. In block 1906, process 1900, in response to detection of an RF anomaly, generates a processed PRACH stream from each receive antenna, in which each processed PRACH stream is graded according to its associated weight factor and the composite scaling value. In block 1908, process 1900 determines a combined PRACH signal based on each processed PRACH stream such that the RF anomaly is suppressed by the associated weight factor that is lower than that of a non-anomalous PRACH signal.

Process 1900 may also include the RF anomaly caused by a faulty antenna in the PRACH receiver.

Process 1900 may also include the RF anomaly caused by channel conditions.

Process 1900 may also include detecting the RF anomaly by normalizing the peak to average power ratio by a max peak to average power ratio to generate a normalized value, and comparing the normalized value to a user-configurable faulty-stream detection threshold.

Process 1900 may also include detecting the RF anomaly by comparing a max peak to average power ratio to a user-configurable PRACH-peak threshold.

Process 1900 may also include determining the weight factor for each receive antenna by calculating a proportion of peak to average power ratio for each receive antenna, and multiplying each proportion by total number of receive antennas and dividing it by the sum of PAPRs of all the antennas.

Process 1900 may also include multiplying each weight factor by the composite scaling value to obtain a result, and multiplying the result by each PRACH signal.

Process 1900 may also include calculating the composite scaling value by determining a collective average of each receive antenna average peak to average power ratio, determining a collective weighted average of each receive antenna average peak to average power ratio, and dividing the collective average by the collective weighted average.

Figure 20:
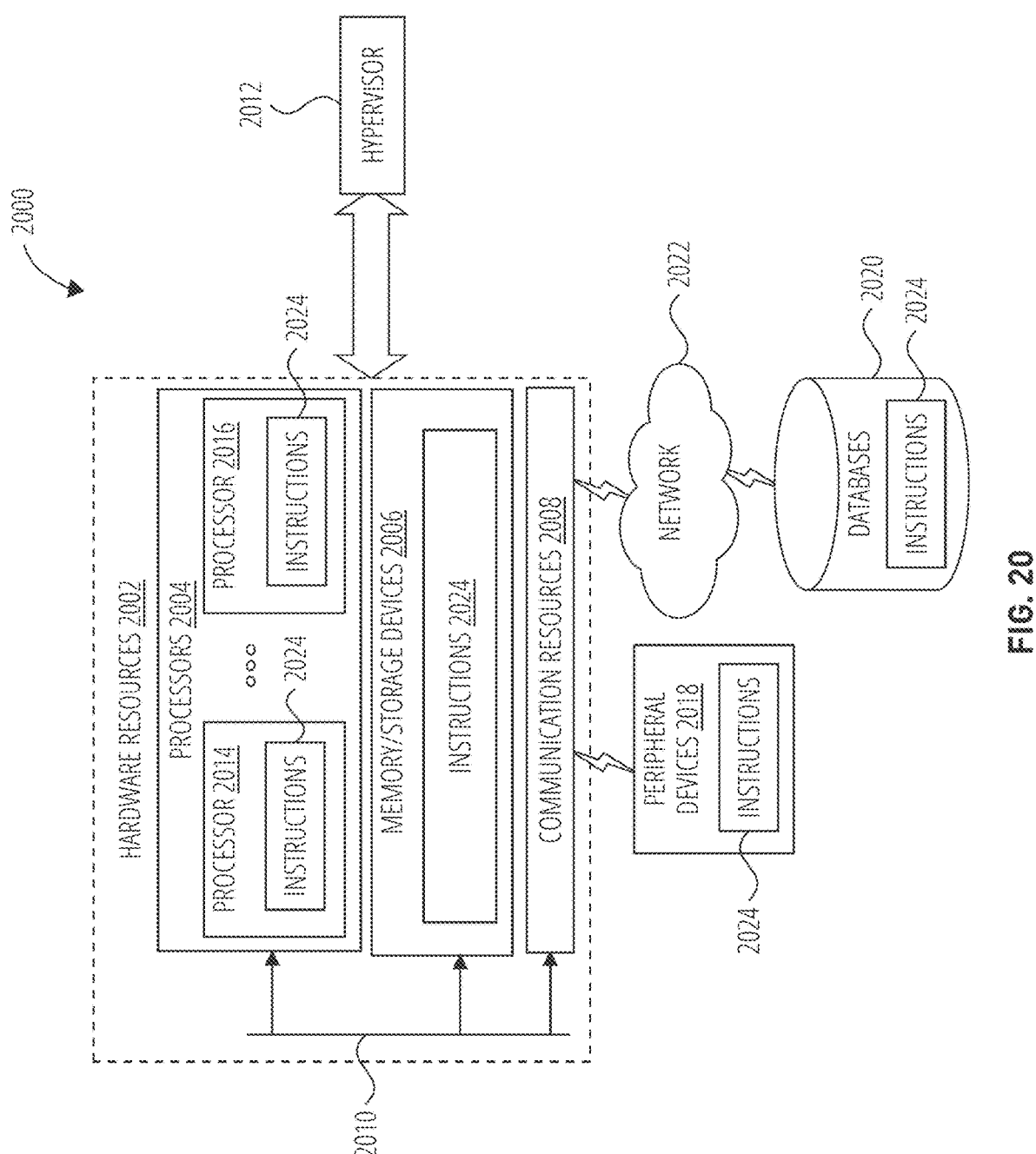
FIG. 20 is a block diagram of computing components for performing the disclosed procedures in accordance with one embodiment.

FIG. 20 is a block diagram illustrating components 2000, according to some example embodiments, configured to read instructions from a machine-readable or computer-readable medium (e.g., a non-transitory machine-readable storage medium) and perform any one or more of the methods discussed herein (or portions thereof), such as discussed for process 500, system 600, process 700, processes 1900, or any portions of these embodiments.

Specifically, FIG. 20 shows a diagrammatic representation of hardware resources 2002 including one or more processors 2004 (or processor cores), one or more memory/storage devices 2006, and one or more communication resources 2008, each of which may be communicatively coupled via a bus 2010. For embodiments where node virtualization (e.g., NFV) is utilized, a hypervisor 2012 may be executed to provide an execution environment for one or more network slices/sub-slices to utilize hardware resources 2002.

Processors 2004 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 2014 and a processor 2016.

Memory/storage devices 2006 may include main memory, disk storage, or any suitable combination thereof. Memory/storage devices 2006 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 2008 may include interconnection or network interface components or other suitable devices to communicate with one or more peripheral devices 2018 or one or more databases 2020 via a network 2022. For example, communication resources 2008 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2024 may comprise software, a program, an application, an applet, an app, or other executable code for causing at least any of processors 2004 to perform any one or more of the methods discussed herein. Instructions 2024 may reside, completely or partially, within at least one of processors 2004 (e.g., within the processor's cache memory), memory/storage devices 2006, or any suitable combination thereof. Furthermore, any portion of instructions 2024 may be transferred to hardware resources 2002 from any combination of peripheral devices 2018 or databases 2020. Accordingly, the memory of processors 2004, memory/storage devices 2006, peripheral devices 2018, and databases 2020 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method of antenna combining in a PRACH receiver so as to increase PRACH detection, the method comprising:
   detecting an RF anomaly based on a peak to average power ratio for each receive antenna;
   determining a weight factor for each receive antenna and a composite scaling value;
   in response to detection of the RF anomaly, generating a processed PRACH stream from each receive antenna, in which each processed PRACH stream is graded according to its associated weight factor and the composite scaling value; and
   determining a combined PRACH signal based on each processed PRACH stream such that the RF anomaly is suppressed by the associated weight factor that is lower than that of a non-anomalous PRACH signal.

2. The method of claim 1, in which the RF anomaly is caused by a faulty antenna in the PRACH receiver.

3. The method of claim 1, in which the RF anomaly is caused by channel conditions.

4. The method of claim 1, in which the detecting the RF anomaly comprises:
   normalizing the peak to average power ratio by a max peak to average power ratio to generate a normalized value; and
   comparing the normalized value to a user-configurable faulty-stream detection threshold.

5. The method of claim 1, in which the detecting the RF anomaly comprises comparing a max peak to average power ratio to a user-configurable PRACH-peak threshold.

6. The method of claim 1, in which the determining the weight factor for each receive antenna comprises:
   calculating a proportion of peak to average power ratio for each receive antenna; and
   multiplying each proportion by a total number of receive antennas.

7. The method of claim 6, further comprising:

multiplying each weight factor by the composite scaling value to obtain a result; and multiplying the result by each PRACH signal.

8. The method of claim 1, further comprising calculating the composite scaling value.

9. The method of claim 8, in which the calculating comprises:

determining a collective average of each receive antenna average peak to average power ratio;

determining a collective weighted average of each receive antenna average peak to average power ratio; and dividing the collective average by the collective weighted average.

10. A non-transitory computer-readable medium storing instructions for antenna combining in a PRACH receiver so as to increase PRACH detection, the instructions, when executed by an O-DU for a 5G communication system, configure the O-DU to:

detect an RF anomaly based on a peak to average power ratio for each receive antenna;

determine a weight factor for each receive antenna and a composite scaling value;

in response to detection of the RF anomaly, generate a processed PRACH stream from each receive antenna, in which each processed PRACH stream is graded according to its associated weight factor and the composite scaling value; and determine a combined PRACH signal based on each processed PRACH stream such that the RF anomaly is suppressed by the associated weight factor that is lower than that of a non-anomalous PRACH signal.

11. The non-transitory computer-readable storage medium of claim 10, in which the RF anomaly is caused by a faulty antenna in the PRACH receiver.

12. The non-transitory computer-readable storage medium of claim 10, in which the RF anomaly is caused by channel conditions.

13. The non-transitory computer-readable storage medium of claim 10, in which the instructions to detect the RF anomaly further configure the O-DU to:

normalize the peak to average power ratio by a max peak to average power ratio to generate a normalized value; and compare the normalized value to a user-configurable faulty-stream detection threshold.

14. The non-transitory computer-readable storage medium of claim 10, in which the instructions to detect the RF anomaly further configure the O-DU to compare a max peak to average power ratio to a user-configurable PRACH-peak threshold.

15. The non-transitory computer-readable storage medium of claim 10, in which the instructions to determine the weight factor for each receive antenna further configure the O-DU to:

calculate a proportion of peak to average power ratio for each receive antenna; and multiply each proportion by a total number of receive antennas.

16. The non-transitory computer-readable storage medium of claim 15, in which the instructions further configure the O-DU to:

multiply each weight factor by the composite scaling value to obtain a result; and multiply the result by each PRACH signal.

17. The non-transitory computer-readable storage medium of claim 10, in which the instructions further configure the O-DU to calculate the composite scaling value.

18. The non-transitory computer-readable storage medium of claim 17, in which the instructions to calculate further configure the O-DU to:

determine a collective average of each receive antenna average peak to average power ratio;

determine a collective weighted average of each receive antenna average peak to average power ratio; and divide the collective average by the collective weighted average.

\* \* \* \* \*